United States Patent Office 3,169,960
Patented Feb. 16, 1965

3,169,960
ARYLOXAZOLYL OPTICAL BRIGHTENING
AGENTS
Kenzo Konishi, Nishinomiya, Minoru Furukawa, Kawachi, and Yuji Maruyama, Sakai, Japan, assignors to Daito Chemical Industry Company, Limited, Daito, Japan
No Drawing. Filed July 16, 1962, Ser. No. 210,177
Claims priority, application Japan, July 21, 1961, 36/26,142; July 31, 1961, 36/27,677, 36/27,678; Dec. 29, 1961, 36/48,290
2 Claims. (Cl. 260—240)

This invention relates to the optical brightening agents. More particularly, the invention pertains to a novel series of aryloxazolyl derivatives which are provided as the most effective optical brightening agents ever produced in the art.

The aryloxazolyl derivatives of this invention comprise $\alpha,\beta$-bis-(aryloxazolyl-(2))-ethylene compounds having the general formula:

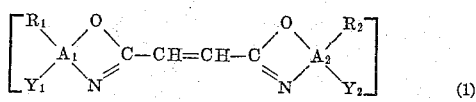

(1)

wherein each of $A_1$ and $A_2$ is a benzene nucleus or a naphthalene nucleus; $R_1$ and $R_2$ are respectively a hydrogen atom or a methyl or an ethyl group; $Y_1$ is a hydrogen atom or —$CH_2B$, and $Y_2$ is —$CH_2B$, B being —$NH_2$ or a residual radical of primary amine or single or mixed secondary amine.

As will be stated later, the aryloxazolyl derivative of this invention can be applied to a variety of articles, both natural and synthetic. The article to be treated is dipped in an aqueous solution or a dispersion of said derivative, or said derivative is employed in itself by mixing in the textile or plastics material in the course of the manufacturing or molding process of said material. The resultant brightness and fastness to light and washing are pronounced.

According to one method of preparing the aryloxazolyl derivatives of this invention, $\alpha,\beta$-bis-(aryloxazolyl-(2))-ethylene having the formula:

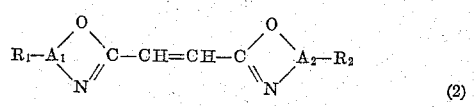

(2)

wherein $A_1$, $A_2$, $R_1$ and $R_2$ are as defined above, is reacted with formaldehyde at 20° to 80° C. in the presence of sulfuric acid and chlorosulfonic acid to introduce a halogenomethyl group into the $A_1$ and/or $A_2$ ring. Instead of formaldehyde, dihalogenomethyl ether can also be employed in the presence of a dehydrating agent, such as sulfuric acid and zinc chloride.

The resulting halogenomethylated compound is then reacted with ammonia or a primary or secondary amino compound in the presence of an organic solvent, such as benzene, toluene or chlorobenzene, to replace a halogenmethyl group with an aminomethyl group, whereby the desired aminomethylated compound of Formula 1 of this invention is obtained.

The aminomethylating reaction can also be performed in the presence of a weak alkaline neutralizer, such as sodium acetate or sodium carbonate, or by employing the amino compounds in excess as a solvent and neutralizer. The reaction is performed for a couple or tens of hours at a temperature ranging from room temperature to the boiling point at the amino compound or the solvent or the neutralizing solution employed, that is, usually at a temperature below 200° C.

According to another method of preparing aryloxazolyl derivatives of this invention, $\alpha,\beta$-bis-(aryloxazolyl-(2))-ethane having the formula:

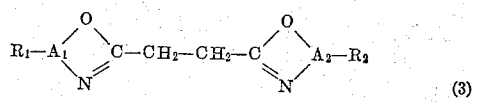

(3)

wherein $A_1$, $A_2$, $R_1$ and $R_2$ are respectively defined as above, is reacted with formaldehyde or dihalogenomethyl ether in the same manner as stated above to introduce a halogenomethyl group into the $A_1$ and/or $A_2$ ring. The resulting halogenomethylated compound is then reacted with ammonia or a primary or a secondary amino compound also in the same manner as stated above to replace the halogenomethyl group with an aminomethyl group.

The resulting aminomethylated compound is then reacted at 50° to 180° C. in an acidic aqueous solution or in a solvent with active chlorine or an active chlorine producing agent, such as thionyl chloride or sulfuryl chloride, in the presence of iodine, or with a relatively mild oxidant, such as hydrogen peroxide, nitrobenzene, mercuric acetate or mercuric oxide. Then the ethane bond is dehydrated into a double bond, producing the desired product of Formula 1 of this invention.

According to a further method of preparing aryloxazolyl derivatives of this invention, $\alpha,\beta$-bis-(aryloxazolyl-(2))-ethane of Formula 3 is reacted with formaldehyde or dihalogenomethyl ether in the manner as described above. The resulting halogenomethylated ethane compound is then reacted in aqueous media or an organic solvent with active chlorine or an active chlorine producing agent, such as thionyl chloride or sulfuryl chloride, in the presence of iodine, or with a relatively mild oxidant, such as hydrogen peroxide nitrobenzene, mercuric acetate or mercuric oxide. The resulting halogenomethylated ethylene compound is then reacted with the amino compound in the manner as described above the produce the desired product of Formula 1 of this invention.

In order to prepare a compound of Formula 1 of this invention having one aminomethyl group, to 1 mol of the starting material of Formulas 2 and 3 is added in the presence of sulfuric acid and chlorosulfonic acid 1 mol of formaldehyde in the form of gas or aqueous solution or paraformaldehyde. Otherwise, 1 mol of dihalogenomethyl ether is added in the presence of a dehydrating agent, such as sulfuric acid or zinc chloride. One halogenomethyl group is thus introduced into one of the aryl rings $A_1$ and $A_2$ of Formulas 2 and 3.

In order to prepare a compound of Formula 1 of this invention having 2 aminomethyl groups, to 1 mol of the starting material of Formulas 2 and 3 are added in the presence of sulfuric acid and chlorosulfonic acid 2 mols of formaldehyde in the form of gas or aqueous solution or paraformaldehyde. Otherwise, 2 mols of dihalogenomethyl ether are added in the presence of a dehydrating agent, such as sulfuric acid or zinc chloride. Thus each of the aryl rings $A_1$ and $A_2$ is halogenomethylated. But no more than one halogenomethyl group can be introduced into each of the aryl rings, even if the reactant is employed in the order of more than 2 mols.

The halogenomethylating process can be greatly promoted when hydrogen halide is employed in the form of gas, particularly when it is generated in the form of gas in the reaction mixture by the action of sulfuric acid or chlorosulfonic acid with the dried sodium chloride newly added.

The aminomethylating process of this invention does not yield quaternary ammonium salts, because $NH_3$ and primary and secondary amino compounds employed act as a neutralizer. Accordingly, the aminomethylating process can be profitably promoted when the amino compound is employed in excess or in the presence of a weak alkaline neutralizer.

The reactants employed in this invention for aminomethylating the halogenomethylated compounds are ammonia and primary and secondary amino compounds, such as methylamine, ethylamine, butylamine, octylamine, dimethylamine, diethylamine, dibutylamine, ethanolamine, diethanolamine, β-dimethylaminoethylamine, cyclohexylamine, dicyclohexylamine, aniline, toluidine, N-methylaniline, N-(α-oxyethyl)-aniline, piperidine, pipecoline, morpholine, guanidine, 2-aminothiazole, etc.

To make the product of this invention water soluble, said product is conventionally converted into an acid salt by the action of an organic acid, such as acetic acid and formic acid, or of an inorganic acid such as sulfuric acid. The aqueous solution of said acid salt, furthermore, precipitates when neutralized with alkali. The product of this invention can accordingly be isolated from the reaction system and refined without employing an expensive organic solvent. This is also the case with the oily products of this invention where the aryl ring is replaced with dibutylaminomethyl or dioctylaminomethyl group.

As stated before, the products of this invention can be applied to a variety of articles. Those articles which can be optically brightened with the products of this invention are synthetic fibers, fabrics, moldings, and the like of polyacrylonitrile and copolymers thereof, polyamide, polypropylene, polyethylene, polyvinylacetal, and the like; artificial fibers, fabrics and moldings of viscose cellulose and cellulose acetate, and natural fibers and fabrics of wool, cotton, and the like.

The products of Formula 1 of this invention are water insoluble. But the products dissolve in an organic solvent, such as acetone, alcohol, dimethylformamide, benzene, and chlorobenzene. Said products are accordingly employed by dissolving in an organic solvent as specified above or by dispersing in aqueous media with said solvent or a known dispersing agent. Said products can also be employed by mixing in the original form in the article in the course of its manufacturing or molding process.

For the first time in the art where it still remains impossible to obtain brightened moldings of the organic polymers, the present invention has made it practicable to obtain various forms of moldings of improved brightness by mixing the product in the article in the course of the polymerization process of a monomer employed as the raw material or of the spinning or molding process of the organic polymers.

The brightening agents of this invention can produce satisfactory fastness to light and washing and improved brightness when employed in the order of 0.01 weight percent. The brightening effect, however, does not increase even when the agent is employed in amount of more than 2 weight percent. In a majority of cases, the brightening treatment is performed for about 60 minutes at a temperature ranging from room temperature to 130° C. The brightening agents of this invention can also be used with a conventional bleaching, washing and finishing agent. The brightening effect of this invention is not affected when crease-proof or antielectrification processing is applied, or when heat is employed in the course of the manufacturing process of the articles to be treated. The yield is very good as will be stated in the following preferred examples.

*Example 1*

To 30 parts of 98% sulfuric acid were added dropwise with stirring at a temperature lower than 10° C. 10 parts of chlorosulfonic acid. In the resultant solution were dissolved portionwise 10 parts of α,β-bis-(5-methylbenzoxazolyl-(2))-ethylene and then 12 parts of paraformaldehyde. The homogeneous solution thus prepared was heated slowly to 70° C. and kept at said temperature for 40 hours. In the course of the reaction were added portionwise 30 parts of sodium chloride. The reaction mixture was then poured into ice water, and the precipitating pale yellow crystals were separated by filtration, washed with water, neutralized in a diluted aqueous solution of sodium bicarbonate, dried, and recrystallized in an organic solvent such as benzene or xylene.

25 parts of α,β-bis-(chloromethyl-5-methylbenzoxazolyl-(2))-ethylene thus obtained and refined were then dissolved at 110° C. in 200 parts of monochlorobenzene, and 24.2 grams of piperidine were added dropwise at 80° C. with stirring in 30 minutes. The stirring was further continued at the same temperature for 12 hours to complete the reaction. The precipitating crystals of piperidine hydrochloride were then separated by filtration and distilled to remove monochlorobenzene. The residue was dissolved in 20% hydrochloric acid, decolorized with 3 parts of active carbon, filtered, and neutralized with 10% aqueous solution of sodium carbonate, yielding 29 parts of pale yellow crystals of the formula:

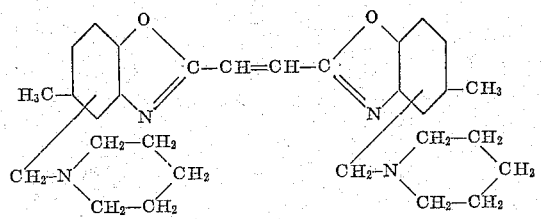

This substance can be recrystallized with dioxane.

27.9 parts of α-pipecoline, 20.5 parts of diethylamine or 27.9 parts of cyclohexylamine employed instead of piperidine produced a corresponding aminomethyl derivative in the yield of 87% to 92% of theoretical. α,β-Bis-(chloromethyl-5-methylbenzoxazolyl-(2)) - ethylene can be dissolved in benzene or toluene instead of monochlorobenzene, and the reaction can be performed without the solvent as specified above.

*Example 2*

In 318 parts of 98% sulfuric acid were dissolved slowly in 30 minutes at a temperature below 10° C. 31.8 parts of α,β-bis-(5-ethylbenzoxazolyl-(2))-ethylene. 34.5 parts of dichloromethyl ether were added dropwise at the same temperature. The mixture was heated for 1 hour to 50° C. and kept at the same temperature for 48 hours. In the course of the reaction were added 60 parts of dried sodium chloride portionwise. The resultant reaction mixture was poured slowly into 1,000 parts of ice water. The precipitating crystals were separated by filtration, washed with water, neutralized in a 5% aqueous solution of sodium bicarbonate, and dried, yielding 38.2 parts of α,β-bis-(chloromethyl-5-ethylbenzoxazolyl-(2))-ethylene. The same result was obtained with 70 parts of dried hydrochloric acid gas which was passed through the solution instead of 60 grams of sodium chloride.

36.3 parts of the resultant α,β-bis-(chloromethyl-5-ethylbenzoxazolyl-(2))-ethylene were then dissolved at 80° C. in 363 parts of benzene, and cooled to 60° C. 8.6 parts of sodium acetate anhydride were added. 25.2 parts of diethanolamine were then added dropwise in 30 minutes with stirring, and the agitation was continued for further 8 hours at 60° C. After completion of the reaction, the mixture was warmed to 80° C. and stirred for 2 hours, and the benzene was steam distilled off. The residue was filtered with methyl alcohol, and dried, yielding 45 parts of pale yellow crystals of the formula:

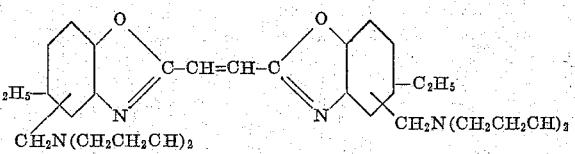

This substance can be recrystallized with isopropyl alcohol.

20.9 parts of morpholine, 25.8 parts of dibutylamine or 22.5 parts of 60% aqueous solution of dimethylamine employed instead of diethanolamine also produced a corresponding aminomethyl derivative almost in the same yield as stated above.

Example 3

To 50 parts of 98% sulfuric acid were added slowly at a temperature lower than 10° C. 10 parts of chlorosulfonic acid and then 10 parts of α,β-bis-(5-methylbenzoxazolyl-(2))-ethane. When the reactant was completely dissolved, 12 parts of paraformaldehyde were added. The resultant homogeneous solution was warmed to 50° C. and kept at the same temperature for 48 hours. In the course of the reaction were added slowly 30 parts of sodium chloride. The reaction having been completed, the mixture was poured into ice water, and the precipitating pale yellow crystals were separated by filtration, washed with water, neutralized in a diluted aqueous solution of sodium bicarbonate, dried, and extracted with benzene. Yield: 13 parts.

39.3 parts of the resultant α,β-bis-(chloromethyl-5-methylbenzoxazolyl-(2))-ethane were then dissolved at 80° C. in 393 parts of benzene. 37.5 parts of piperidine were added dropwise in 30 minutes with stirring, and the stirring was continued for further 10 hours at the same temperature. After completion of the reaction, the precipitating piperidine hydrochloride was filtered and distilled to remove benzene. The residue was then dissolved in 20% hydrochloric acid, decolorized with 5 parts of active carbon, and slightly alkalized with 10% sodium carbonate. The resultant brownish yellow precipitates were separated by filtration, washed with water, and dried. Yield: 45 parts.

Said product was then dissolved in 135 parts of o-dichlorobenzene and stirred at 150° C. for 2 hours with 23.8 parts of mercuric oxide and 0.9 part of glacial acetic acid. The precipitating mercury was separated by filtration, and the o-dichlorobenzene was distilled off. The resultant residue was dissolved in 20% hydrochloric acid, decolorized with 4 parts of active carbon, and filtered. The filtrate was then slightly alkalized with 10% sodium carbonate, and the precipitating pale yellow crystals were separated by filtration and recrystallized with dioxane, yielding the following substance:

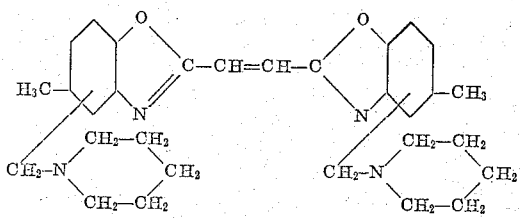

32.2 parts of diethylamine or 43.8 parts of cyclohexylamine employed instead of piperidine produced a corresponding aminomethyl derivative almost in the same yield.

Example 4

To 834 parts of 98% sulfuric acid were added in 30 minutes with stirring at a temperature lower than 10° C. 28.0 parts of α-benzoxazolyl-β-5-methylbenzoxazolyl-2,2'-ethane. Following the completion of dissolution, 46 parts of dichloromethyl ether were added dropwise in 30 minutes at the same temperature. The mixture was then warmed to 40° C. and kept at the same temperature for 40 hours. In the course of the reaction, 55 parts of dried hydrogen chloride gas were passed. The resultant reaction mixture was then cooled to 10° C. and poured into 3,000 parts of ice water. The precipitating crystals were separated by filtration, washed with water, neutralized with a slight amount of 5% sodium bicarbonate, and dried.

36.5 parts of the resultant α-halogenomethylbenzoxazolyl - β - halogenomethyl-5-methylbenzoxazolyl-2,2'-ethane were then dissolved at 110° C. in 292 parts of monochlorobenzene, cooled to 60° C., and 43.8 parts of pipecoline were added dropwise. Stirring was continued for 12 hours at the same temperature, and monochlorobenzene was distilled off. The residue was dissolved in 132 parts of glacial acetic acid at room temperature, decolorized with 4.4 parts of active carbon, filtered, and reacted at 100° C. for 2 hours with stirring with 34.4 parts of mercuric acetate. The precipitating mercury being filtered off, the filtrate was decolorized with 4.4 parts of active carbon and distilled under reduced pressure. About 100 parts of acetic acid were recollected. The residue was then poured into 300 parts of water and weakly alkalized with a 10% aqueous solution of sodium carbonate, yielding a pale yellow substance of the following formula:

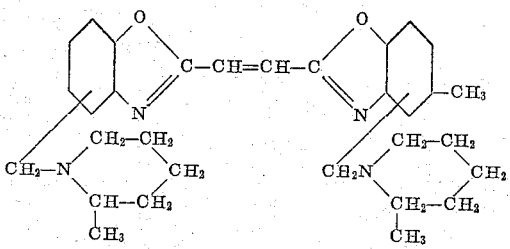

This substance can be recrystallized with dioxane.

Example 5

To the mixture of 467 grams of 98% sulfuric acid and 36 grams of paraformaldehyde were added dropwise at 10° C. 292 grams of chlorosulfonic acid. After complete dissolution with agitation, 29.2 grams of α,β-bis-(5-methylbenzoxazolyl-(2))-ethane, and then 58.4 grams of sodium chloride were added. The mixture was kept at 45° to 50° C., yielding a white crystalline compound of the formula:

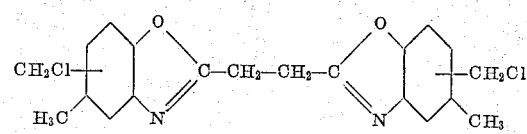

35 grams of the resultant substance were dissolved in 175 grams of glacial acetic acid, decolorized with 3.5 grams of active carbon, and filtered hot. The filtrate was stirred at 25° to 30° C. with 34.6 grams of mercuric acetate, gradually heated to 80° C., and kept at said temperature for 3 hours. After the precipitating mercury was separated hot by filtration, the filtrate was distilled to remove acetic acid. The residue was filtered to remove monochorobenzene and decolorized with active carbon. 21 grams of sodium acetate crystals and then 14.8 grams of piperidine were added dropwise at 80° C. in 15 minutes. The mixture was kept at said temperature for 12 hours and steamdistilled to remove monochlorobenzene. The residue was dissolved in 80 grams of 5% hydrochloric acid, decolorized with active carbon, and neutralized with a 5% aqueous solution of sodium carbonate until no precipitates were yielded. The extract was filtered and dried, yielding a pale yellow powder of the formula:

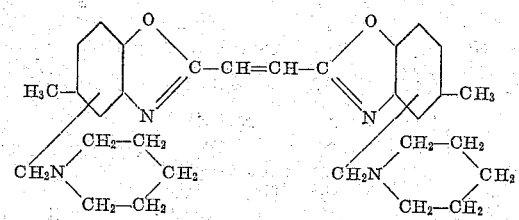

This substance can be recrystallized with dioxane.

10 grams of the compound thus obtained were dissolved in 70 grams of monochlorobenzene, and 6 grams of dimethyl sulfate were added dropwise in 15 minutes at a temperature not higher than 20° C. The mixture was then heated at 60° C. with stirring for 3 hours and cooled. The resultant yellow precipitates were filtered, washed with benzene, and dried, yielding 10.5 grams of a quaternary ammonium compound of the formula:

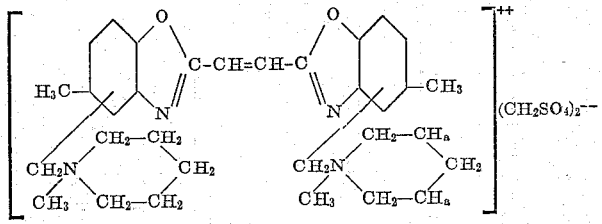

The water soluble compound thus obtained was then dissolved in 30 cc. of water, treated with 1 gram of active carbon, and filtered. The filtrate was added dropwise at 10° C. to a solution of 6 grams of a 50% zinc chloride aqeous solution, 0.1 cc. of hydrochloric acid, 12 grams of sodium chloride, and 50 cc. of water, to yield zinc chloride double salt.

*Example 6*

35 grams of the chloromethyl ethane compound prepared in the manner as described in Example 5 were dissolved with heat in 350 grams of monochlorobenzene. 3.5 grams of active carbon were added. After filtering hot, 0.5 gram of iodine was added. 10 grams of chlorine gas were then passed in 30 minutes at 125° to 130° C., and the mixture was stirred for 15 minutes at said temperature. The mixture was then cooled to 60° C., 24.6 grams of diethylamine were added dropwise in 30 minutes, and stirred at 60° C. for 15 hours. When the reaction was completed, dichlorobenzene was distilled off under reduced pressure. The residue was dissolved in 80 grams of 5% hydrochloric acid, decolorized with active carbon, and weakly alkalized with an aqueous solution of 5% sodium carbonate. The resultant precipitates were filtered and dried, yielding a pale yellow powder of the formula:

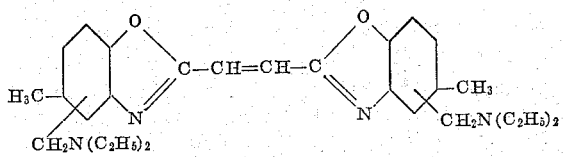

This substance can be recrystallized with isopropyl alcohol.

19 parts of sulfuryl chloride employed instead of chlorine gas also produced the chloromethyl compound almost in the same yield.

*Example 7*

With 0.5 part of condensation product containing 1 mole of nonyl phenol and 9 mole of ethylene oxide and 0.1 part of condensation product of 2 mols of naphthalene sulfonic acid and 1 mol of formaldehyde was dispersed in aqueous media 0.02 part of the compound prepared in accordance with Example 1, to make 500 parts of aqueous dispersion.

In the dispersion thus prepared are dipped at 60° C. 10 parts of polyamide nylon fabrics. The bath was heated to 85° C. for 20 minutes, and the dipping was continued for further 1 hour at said temperature. The fabrics were then washed with water, further dipped for 30 minutes at 90° to 95° C. in a liquor containing 1 part of 86% sodium chlorite, 0.5 part of 80% formic acid, and 500 parts of water, washed with water, and dried. The fabrics thus treated showed a marked brightness and excellent fastness to light. Similar results were obtained with polyvinyl acetal fabrics of 35% acetalization treated in the same manner as described above.

*Example 8*

To an aqueous solution of 1 part of sodium chlorite and 0.5 part of 80% formic acid dissolved in 500 parts of water was added 0.002 part of the quaternary ammonium compound prepared in the manner as described in Example 5.

In the solution thus prepared are dipped at 60° C. 10 parts of polyacrylonitrile fabrics. The bath was heated for 15 minutes to 98° C., and the dipping was continued for further 1 hour at the same temperature. The bath was then cooled for 15 minutes to 70° C., and the fabrics were rinsed with water and dried, exhibiting a marked pure whiteness in contrast to the untreated pale yellow fabrics.

*Example 9*

In 2 parts of water containing 0.8 part of glacial acetic acid was dissolved 0.001 part of the compound prepared in accordance with Example 4 and diluted to make 500 parts of aqueous solution.

In the solution thus prepared were dipped at 60° C. 10 parts of thoroughly scoured polyacrylonitrile fiber yarns ("Orlon 42," Du Pont) and heated for 15 minutes to 98° C. The dipping was continued for further 1 hour at said temperature, and the bath was cooled for 15 minutes to 70° C. The yarns were then washed with water and dried, exhibiting a marked whiteness.

The yarns thus treated were further dipped at 60° C. in an aqueous solution consisting of 1 part of sodium chlorite, 0.5 part of 80% formic acid and 500 parts of water. The bath was then heated to 98° to 100° C., and the dipping was continued for further 30 minutes. The resultant yarns showed an excelled brightness as compared with untreated yarns.

Almost the same effect was obtained when the treatment was performed with a hydrochloride aqueous solution of the compound having the aminomethyl group replaced with

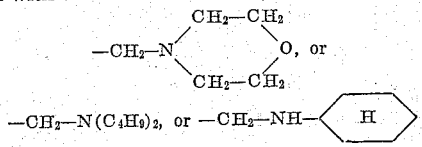

*Example 10*

Cotton fabrics were dipped at 45° C. in a soap bath containing 0.4% of the compound prepared in accordance with Example 3. The fabrics obtained after the ordinary soaping treatment were much improved in whiteness. A similar brightening effect was obtained with sodium carbonate, sodium pyrophosphate, sodium perborate, and other rinsing agents employed instead of soap.

*Example 11*

With 5 parts of copolymer consisting of 65 parts of acrylonitrile and 35 parts of vinyl chloride was suspended in a mixture of 50 cc. of acetone and 1 cc. of acetic acid 0.001 part of the compound prepared in the manner as described in Example 4. After complete dissolution at 45° to 50° C., the solution was spread on a glass plate, and the solvent was removed by heating or in vacuo, producing copolymer films of improved whiteness. Said solution or liquor can also be spun into fibers of improved whiteness, and the same effect can be obtained when the compound of Example 4 is employed with conventional stabilizers, such as metal salts of aliphatic acid, di-tertiary butyl phenol or benzophenone.

*Example 12*

In 100 parts of dimethylformamide was dissolved 0.2 part of the compound of this invention having the formula:

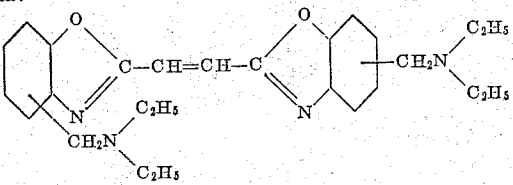

and mixed in a solution containing 200 parts of polyacrylonitrile and 500 parts of dimethylformamide. The resultant liquor was spun into fibers according to the conventional dry spinning method, and the fibers were elongated by 300% in a boiling water bath, showing a pronounced whiteness. When further treated at 95° C. for 30 minutes at a bath ratio of 1:30 in an aqueous solution containing per liter 2 grams of sodium chlorite and 2 grams of acetic acid, the whiteness turned into a blue fluorescent light.

Almost the same effect was obtained with dimethylsulfoxide employed instead of dimethylformamide.

*Example 13*

To a mixture of 1 mol of monomer and 9 mols of dimethylsulfoxide, said monomer being composed of 93 parts of acrylonitrile and 7 parts of methyl acrylate, were added 0.005 part of the compound prepared in accordance with Example 1 and 0.002 part of potassium persulfate and heated at 90° C. for 4 to 5 hours. The resultant copolymer liquor was spun and elongated in the same manner as described in Example 12 into polyacrylonitrile fibers of pronounced brightness. The brightness was further improved when treated at 98° C. for 60 minutes at a bath ratio of 1:50 in an aqueous solution containing per liter 1 gram of 30% hydrogen peroxide and 1 gram of sodium silicate. Almost the same effect was obtained when aforesaid monomer was copolymerized in an aqueous solution containing 51 parts of zinc chloride and 6 parts of acetic acid in 45 parts of water, spun into a coagulating bath, and then elongated by 300%.

What we claim is:

1. An optical brightening agent of the formula

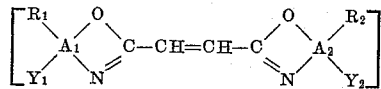

wherein $A_1$ and $A_2$ are each a member selected from the group consisting of a benzene nucleus and a naphthalene nucleus; $R_1$ and $R_2$ are respectively a member selected from the group consisting of hydrogen, methyl and ethyl; $Y_1$ is a member selected from the group consisting of hydrogen and —$CH_2B$, and $Y_2$ is —$CH_2B$, B being a residual radical of a member selected from the group consisting of piperidine, alkylpiperidine, morpholine and guanidine.

2. An optical brightening agent of the formula

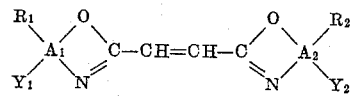

wherein $A_1$ and $A_2$ are phenyl; each of $R_1$ and $R_2$ is a member selected from the group consisting of hydrogen, methyl and ethyl; $Y_1$ is a member selected from the group consisting of hydrogen and —$CH_2B$, and $Y_2$ is —$CH_2B$, B being a residual radical of a member selected from the group consisting of ammonia, primary amine, single secondary amine and mixed secondary amine, said amine having at least a member selected from the group consisting of alkyl, hydroxyalkyl, aminoalkyl, cyclohexyl, phenyl, alkylphenyl and thiazole, and said alkyl group having 1–8 carbon atoms.

References Cited in the file of this patent

UNITED STATES PATENTS

| | | |
|---|---|---|
| 2,483,392 | Meyer et al. | Oct. 4, 1949 |
| 2,590,125 | Robinson et al. | Mar. 25, 1952 |
| 2,646,355 | Zweifel et al. | July 21, 1953 |
| 2,765,303 | Kovacic | Oct. 2, 1956 |
| 2,823,205 | Lacey et al. | Feb. 11, 1958 |
| 2,875,089 | Ackermann et al. | Feb. 24, 1959 |
| 2,985,661 | Hein et al. | May 23, 1961 |
| 3,028,253 | Zweidler | Apr. 3, 1962 |

FOREIGN PATENTS

| | | |
|---|---|---|
| 1,154,529 | France | Nov. 4, 1957 |
| 1,277,168 | France | Oct. 16, 1961 |